United States Patent [19]

Strouse

[11] Patent Number: 4,573,934

[45] Date of Patent: Mar. 4, 1986

[54] SYSTEM FOR IDENTIFYING ENVELOPES HAVING EXCESSIVE PANEL-FUNNEL OFFSET AND DISPENSING ARTICLES

[75] Inventor: Douglas A. Strouse, Lancaster County, Pa.

[73] Assignee: RCA Corporation, Princeton, N.J.

[21] Appl. No.: 636,256

[22] Filed: Jul. 31, 1984

[51] Int. Cl.[4] ........................... H01J 9/26; B23Q 7/12

[52] U.S. Cl. ........................................ 445/3; 445/45; 445/63; 29/563; 209/531; 209/546; 209/598

[58] Field of Search ..................... 445/3, 4, 45, 63, 66; 29/563, 430; 209/531, 546, 598

[56] References Cited

U.S. PATENT DOCUMENTS

| | | | |
|---|---|---|---|
| 3,329,422 | 7/1967 | Hajduk | 269/287 |
| 3,364,728 | 1/1968 | Albertson et al. | 445/3 X |
| 3,543,392 | 12/1970 | Perry et al. | 29/564 |
| 3,807,006 | 4/1974 | Segro et al. | 445/3 |
| 4,157,206 | 6/1979 | Ikeda et al. | 445/63 |
| 4,373,237 | 2/1983 | Bakker et al. | 445/3 |
| 4,374,451 | 2/1983 | Miller | 445/45 X |
| 4,377,890 | 3/1983 | Miller | 445/45 X |

FOREIGN PATENT DOCUMENTS

| | | | |
|---|---|---|---|
| 140456 | 10/1979 | Japan | 445/3 |

*Primary Examiner*—Kenneth J. Ramsey
*Attorney, Agent, or Firm*—E. M. Whitacre; D. H. Irlbeck; L. L. Hallacher

[57] ABSTRACT

A kinescope envelope which rests on a fixture is positioned at a location where the envelope size is determined. The envelope is removed from the fixture and positioned at a preselected position where the panel-funnel offset is determined. The size and offset of the envelope are provided to a controller and the offset is compared to a stored designed offset to determine an offset difference. The offset difference is compared to an offset tolerance and a reject signal is provided when the offset tolerance is exceeded. The reject signal is used to place a reject mark on the envelope and to dispense an identification article onto the potentially defective fixture.

12 Claims, 3 Drawing Figures

SYSTEM FOR IDENTIFYING ENVELOPES HAVING EXCESSIVE PANEL-FUNNEL OFFSET AND DISPENSING ARTICLES

BACKGROUND

This invention relates generally to the manufacture of kinescopes for color television receivers, or computer displays and particularly to a system for identifying envelopes having excessive offset between the panel and funnel of such a kinescope and for dispensing identification articles onto fixtures which carried rejected envelopes.

The picture tube, or kinescope, for a color television receiver, or computer display, is composed of a faceplate panel and a funnel which are fritted together along mating sealing edges. A frit material is placed on the sealing edge of either the panel or the funnel. The panel and funnel are placed together in a fixture which conveys them into an oven. The fixture includes reference members which accurately position the funnel and the panel relative to one another so that the sealing edges of the two elements properly mate along a smooth seal line. The fixture is moved by a conveyor system through the oven and the frit material vitrifies to permanently join the panel and funnel. Typically kinescopes are substantially rectangular with slightly rounded sides. The proper operation of the kinescopes requires accurate alignment of the panel and funnel along the major axis, i.e., the horizontal axis when the kinescope is in the viewing orientation. For this reason, the funnel is provided with a reference pad on the major axis. The position of the panel with respect to the reference pad is thus indicative of whether or not the panel and funnel are properly aligned. The surface of the reference pad extends beyond the surface of the panel. This extension establishes a designed offset between the funnel pad and the panel. An offset in either direction along the major axis which exceeds the designed offset by a predetermined maximum tolerance indicates an unacceptable kinescope. Because the fixture is used to align the panel and funnel an excessive offset frequently is indicative of a damaged or improperly calibrated fixture. The fixture, therefore, should be repaired or recalibrated to avoid producing additional rejects. For these reasons, there is a need for a system for automatically and accurately measuring the offset between the funnel and panel of a kinescope to verify that the offset does not exceed a predetermined maximum tolerance and for dispensing an identification article onto the fixture to identify the fixture as potentially defective. The invention fulfills this need.

SUMMARY

A system for measuring the panel-funnel offset of tube envelopes and for dispensing identification articles onto the carriers of rejected envelopes, includes an offset measuring means which provides an offset signal. A marker means places a reject mark on the envelope when the offset exceeds a preselected tolerance. A dispenser means dispenses an identification article when the offset exceeds the preselected tolerance. The system also includes a control circuit having means for storing designed offset values for various envelope sizes, means for storing an offset tolerance, and means for providing measured offset values in response to the means for measuring. A first comparison means compares the designed offset value with the measured offset value and provides an offset difference value. A second comparison means compares the offset difference value and the offset tolerance and provides an out of tolerance signal when the offset difference value exceeds the offset tolerance. The out of tolerance signal actuates the dispenser and the marker to identify the rejected envelope and the fixture which carried the rejected envelope.

DETAILED DESCRIPTION

Figure 1:
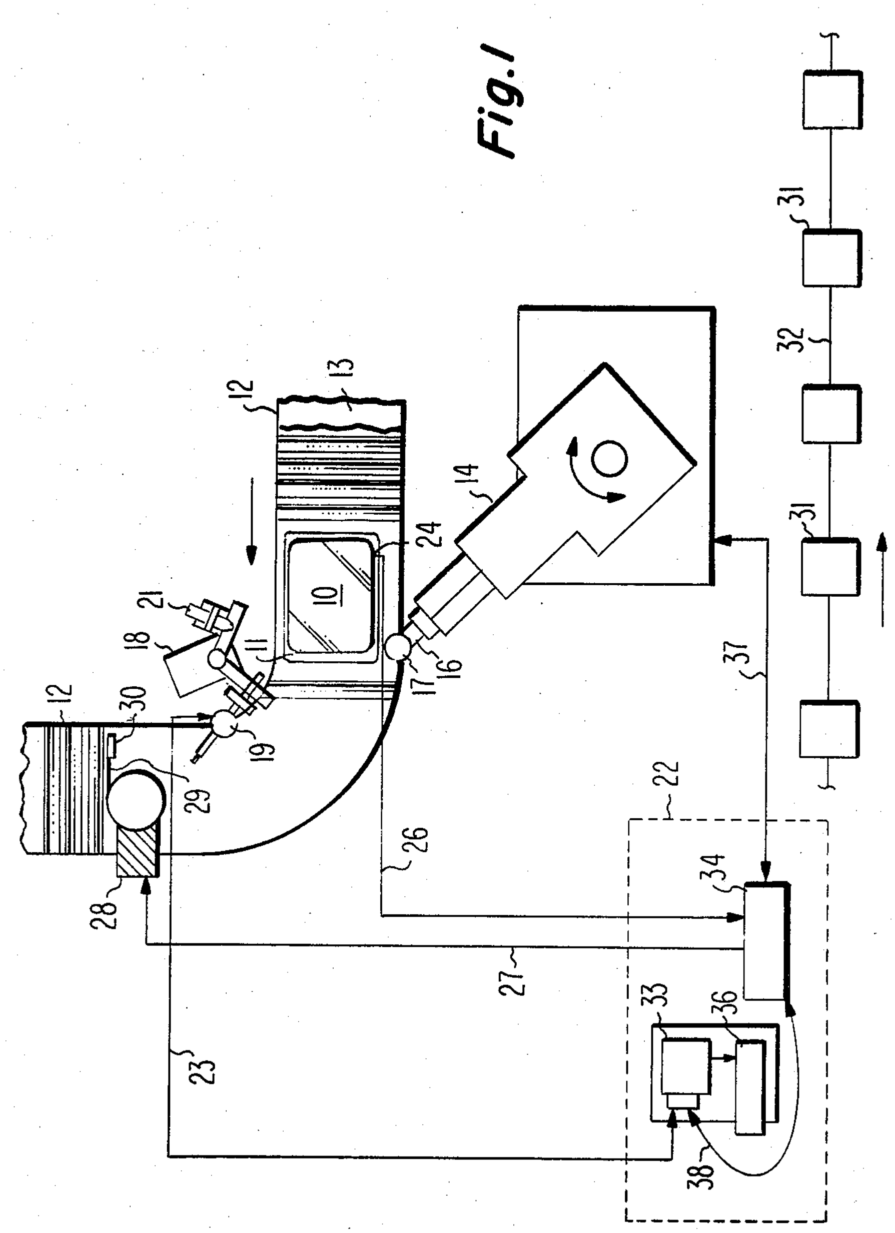
FIG. 1 is a simplified illustration of a transfer system employing the inventive control system.

In FIG. 1, a kinescope envelope 10 rests in a sealing fixture 11 and travels along a conveyor 12. The conveyor 12 includes a plurality of rollers 13 which typically are rotated by a motor and chain mechanism to cause the carrier 11 to move along the conveyor 12. The kinescope envelope 10 is being conveyed from an oven (not shown) in which the funnel and faceplate panel are fritted together to permanently join the two elements. Because of the criticality of the alignment of the sealing edges of the funnel and the panel, it is necessary to measure the offset of the panel with respect to the reference pad to verify the proper alignment and to reject envelopes having improper alignment. Additionally, when an envelope is rejected, there is a high probability that the sealing fixture is defective. For this reason, the fixture should be marked so that it is identified and can be removed from the line to be inspected and repaired or recalibrated.

As the kinescope envelope 10 moves along the conveyor 12 and reaches a predetermined location, a mechanized handling device 14 removes the envelope 10 from the sealing fixture 11. The automatic handling device can be any of many types commercially available, for example, a Unimate model 2000B available from Unimation, a Westinghouse Company, can be used. The handling device includes an extendable arm 16, the end of which supports a suction cup 17, or other gripping mechanism which is used to lift the envelopes from the sealing fixture 11. The handling device is programmable and is programmed to remove the envelope from the sealing fixture and position the envelope at a preselected position and in a preselected orientation. Arranged in the proximity of the preselected position is an offset measuring device 18, the details of which are described in application Ser. No. 600,379 filed Apr. 16, 1984 by Clarence W. Sattazahn and Kenneth J. Diaz entitled "Device for Measuring the Offset Between the Faceplate Panel and Funnel of a Kinescope". The measuring device 18 includes an offset measuring gage 19 and a marking device 21. The measuring device 19 measures the offset between the reference pad on the funnel of the envelope 10 and the side of the faceplate panel to determine whether or not the actual offset exceeds the permissible offset tolerance. When such a excessive offset is detected, the marking device 21 places a reject mark on the side of the rejected funnel.

The offset measurement from the measuring device 19 is provided to a programmable controller 22 over a line 23. The controller 22 is described hereinafter with reference to FIGS. 2*a* and 2*b*. Arranged at the preselected position is an envelope detector 24 which is used to verify the presence of an envelope at the preselected position and also to determine the size of the envelope. The detector 24 can be a photodiode array all the pixels of which are illuminated when no envelope is present at a preselected position. When an envelope is present at the predetermined location, the envelope interrupts some of the light and all of the photodiodes are no longer illuminated. Large envelopes interrupt more light than smaller envelopes and, therefore, the number of nonilluminated pixels is indicative of the size of the envelope. Many devices which can be used for the detector 24 are commercially available, for example a model no. L33007-P33001 photodetector array available from Skana-A-Matic company can be used. The envelope size information from the detector 24 is provided to the programmable controller 22 by a line 26.

When the programmable controller 22 receives the size and offset information, the measured offset is compared with the designed offset to yield a difference offset. The difference offset is then compared to an offset tolerance value which represents the maximum permissible offset for an acceptable envelope. When the difference offset exceeds the offset tolerance, the programmable controller 22 provides a reject signal to the marking device 18 by way of line 23 and a reject mark is placed on the envelope 10 by the marking device 21. Additionally, the reject signal is applied by a line 27 to an article dispensing device 28 which is located on the conveyor 12 downstream from the marking device 18. The dispenser 28 can be the device described in application Ser. No. 600,378 filed Apr. 16, 1984 by Kenneth J. Diaz and Clarence W. Sattazahn entitled "Apparatus for Dispensing Identification Articles to Defective Conveyor Fixtures". After an envelope 10 is removed from the sealing fixture 11, the empty fixture continues to travel along the conveyor 12. When a reject signal is generated by the programmable controller 22, the reject signal actuates a stop mechanism to extend the stop blade 29 and halt the travel of the sealing fixture 11 along the conveyor 12. A fixture sensor 30 is fixed to the stop blade 29. When the empty fixture contacts the sensor, the controller 22 is informed that a fixture is present and an identification article can be dispensed. The reject signal available on the line 27 then actuates the article dispenser 29 and an identification article is dispensed to the potentially defective fixture. The dispensed article identifies the fixture as having carried a rejected envelope 10 and suggests that the fixture may be the cause of envelope defect. The fixture 11, therefore, is removed from the line for examination and repair so that additional defective envelopes are not made.

After the offset of the envelope 10 is measured, the handing device 14 rotates about an axis perpendicular to the plane of the drawing and places the envelope onto one of the carriers 31 of another conveyor line 32. Defective envelopes are identified ,by the defect mark placed on them by the marking device 21 and are removed from the conveyor line 32 prior to any additional processing. ·

The programmable controller 22 includes a general purpose computer 33 and a microprocessor 34. The general purpose computer 33 can be a Hewlett-Packard model 87XM computer or an equivalent type computer having sufficient memory capacity. The microprocessor 34 can be a Modicon model 484 Programmable Computer available from Gould, Inc. or an equivalent microprocessor having sufficient calculating capability. Associated with the computer 33 is a printer 36. A general purpose computer and a microprocessor are both utilized because the general purpose computer 33 interfaces with the printer 36 and has sufficient memory capacity to store inventory data and offset measurement data. Such data can be stored and printed out in hard copy by the printer 36. A microprocessor is used for many of the control functions because microprocessors are much less expensive than general purpose computers. Accordingly, the computer 33 could be used to perform the functions of the microprocessor if sufficient memory capacity were present. Additionally, the microprocessor 34 could be used to completely control the system but the inventory and print out features would have to be surrendered. The microprocessor 34 and the handling device 14 communicate by a line 37. The handling device 14 informs the microprocessor 34 when an envelope is in the preselected position for offset measurement. Also, the microprocessor 34 instructs the handling device to transfer the envelope to the other conveyor.

Figure 2A:
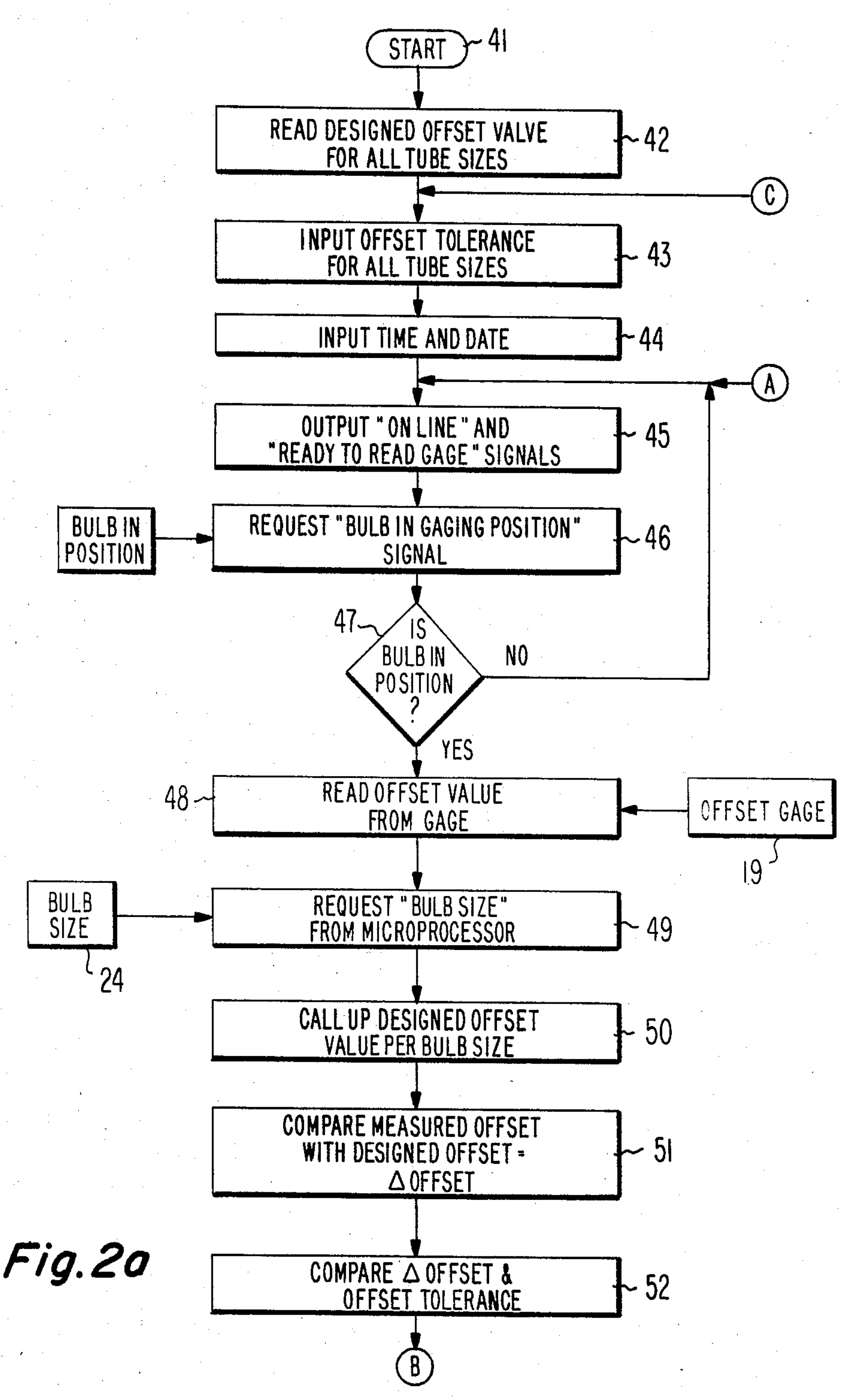
FIGS. 2*a* and 2*b* are a flow chart of a preferred embodiment.
Figure 2B:
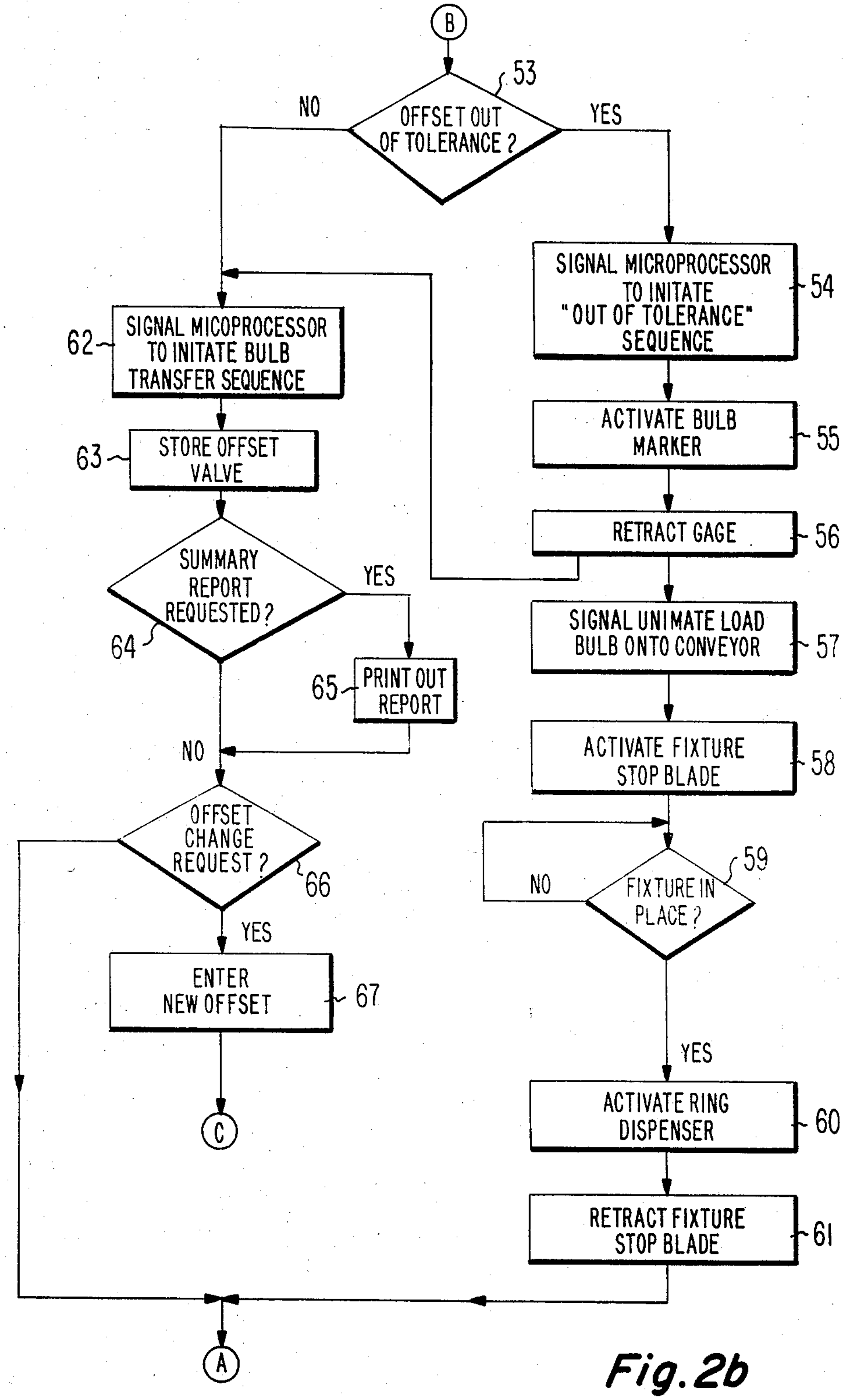

FIGS. 2*a* and 2*b* are a flow chart of a preferred embodiment of the programmable controller 22. The operation starts at 41 and at step 42 the designed offset values for all tube sizes are read. As is known, there are many sizes of kinescopes and the envelopes of all sizes randomly move along the conveyor 12. Each envelope size has a particular designed offset value. The designed offset values for all sizes are stored in memory by the computer 33 and are read at step 42 in FIG. 2*a*. At step 43, the offset tolerance for all tube sizes is input to the system. Despite the variation in tube sizes, the permissible panel/funnel offset for an operative tube is substantially the same for all tube sizes and, accordingly, preferably only one tolerance need be utilized in the system. At step 44, the time and date that the measurement is being made are provided. This step is useful for the inventory and the record keeping which are also performed by the programmable controller 22 when desired.

At step 45, the computer 33 of FIG. 1 informs the microprocessor 34 by way of line 38 that the computer is on line and ready to receive input signals from the measurement gage 19. At step 46, the microprocessor 34 receives a signal from the handling device 14 to indicate that an envelope is located at the preselected position. At step 47 when an envelope is not in position, the on-line indication at step 45 is repeated until the handling device 14 positions an envelope at the preselected position. When a bulb in position signal is received at step 47, the offset gage 19 of FIG. 1 provides an offset measurement to the computer 33 by way of the line 23 at step 48.

At step 49, the size signal from the sensor 24 is provided to inform the programmable controller 22 of the size of the envelope. This bulb size signal results in the designed offset value for that particular size of envelope being called up at step 50. In comparator 51, the measured offset value from the offset gage 19 is compared with the designed offset value to provide an offset difference signal. In comparator 52, the offset difference signal is compared with the offset tolerance which was provided to the system at step 43. In FIG. 2*b*, when the offset difference exceeds the offset tolerance, the system proceeds to step 54 and the microprocessor 34 is instructed to initiate an "out of tolerance sequence" which results in the provision of an out-of-tolerance signal. At step 55 the reject indication is used to activate the bulb marker 21 of FIG. 1 to place a reject mark on the envelope. At step 56, the offset measurement gage 19 is retracted away from the envelope 10. Also step 62 is entered to signal the microprocessor 34 to instruct the handling mechanism 14 to transfer an envelope transfer sequence. At step 57 the handling device 14 is instructed to transfer the envelope from the conveyor 12 and to place the envelope onto one of the carriers 31 of the conveyor 32. At step 58 and while the envelope is being transferred between carriers, the reject indication is utilized to activate the stop mechanism 29 to stop the movement of the carrier 11 on the conveyor 12. At step 59, when the fixture 11 reaches the dispensing apparatus 28, the fixture sensor 30 senses the presence of the fixture 11 and the dispenser 28 is activated at step 60 to drop an identification article, such as a ring, onto the fixture 11 to identify the fixture as potentially defective. At 61, the stop blade 29 is retracted to permit the fixture to move along the conveyor and step 45 of FIG. 2*a* is reentered and the programmable controller 22 is ready to receive data from the next envelope on the conveyor 12.

When the tolerance comparator 53 indicates that the offset is in tolerance, step 62 is entered and the microprocessor 34 instructs the handling device 14 to initiate the transfer sequence to transfer the envelope 10 to one of the carriers 31 on the conveyor 32. At 63, the offset value received from the measuring device 19 is stored. At step 64 when a summary report is requested, the desired information is printed out at step 65 and step 66 is entered to determine whether or not an offset change is requested, step 66 is also entered when a summary report is not requested. Offset change requests can be manually made by the operator of the system and is used to change the offset tolerance provided to the system at step 43. When no offset change is requested, step 45 is reentered and the system is ready to receive information from the next envelope. When an offset change is requested, the change is entered at step 67 and step 43 is reentered to provide the new tolerance.

What is claimed is:

1. A system for measuring the panel-funnel offset of tube envelopes and for dispensing identification articles onto the fixtures of rejected envelopes comprising:

means for measuring said panel-funnel offset and providing a measured offset value;

means for sensing the size of said envelope and providing a size signal to identify said envelope as one of several envelope sizes;

means for dispensing an identification article onto the fixture of envelopes having an excessive panel-funnel offset;

means for placing a reject mark on envelopes having an excessive panel-funnel offset;

programmable control means for receiving said measured offset value, said control means having a stored designed offset value for each of said envelope sizes and an offset tolerance value for all of said envelope sizes; said control means including first comparison means for receiving said measured offset value and one of said designed offset values in accordance with said size signal and providing an offset difference, second comparison means for receiving said offset difference and said offset tolerance for providing a reject signal when said offset difference exceeds said offset tolerance whereby said reject signal actuates said means for dispensing and said means for placing to dispense an identification article onto said fixture and to place a reject mark onto said envelope.

2. The system of claim 1 further including stop means responsive to said reject signal for stopping said fixture in the proximity of said means for dispensing.

3. The system of claim 2 further including first and second conveyance means, and further including means for transferring said envelopes from said first conveyance means to said second conveyance means.

4. The system of claim 3 wherein said means for transferring positions said envelopes at a preselected position in the proximity of said means for measuring.

5. The system of claim 4 further including printer means responsive to said programmable control means for printing envelope size and offset data.

6. A system for measuring the panel-funnel offset of tube envelopes and for dispensing identification articles onto the carriers of rejected envelopes, said system including means for measuring said offset and providing an offset signal, means for placing a reject mark on said envelope when said offset exceeds a preselected tolerance, means for transferring said envelopes from one conveyance mechanism to another conveyance mechanism, means for dispensing said identification articles, and a control circuit comprising:

means for storing designed offset values for various envelope sizes;

means for storing an offset tolerance;

means for providing measured offset values in response to said means for measuring;

first comparison means for comparing said designed offset value with said measured offset value and providing an offset difference value;

second comparison means for comparing said offset difference value and said offset tolerance and providing an out of tolerance signal when said offset difference value exceeds said offset tolerance; whereby said out of tolerance signal actuates said means for dispensing and said means for placing to identify a rejected envelope and the fixture of said rejected envelope.

7. The system of claim 6 wherein said means for transferring positions said envelope in a preselected position and orientation in the proximity of said means for measuring.

8. The system of claim 7 further including carrier stop means for stopping envelope fixtures in the proximity of said means for dispensing in response to said out of tolerance signal.

9. A method of measuring the panel-funnel offset of an envelope for a color picture tube and for placing an identification article on the fixture of rejected envelopes including the steps of:

placing a list of designed offset values for various envelope sizes into the memory of a programmable controller;

placing at least one offset tolerance value into said controller memory;

positioning an envelope at a preselected position and measuring the panel-funnel offset to provide a measured offset and determining the size of said envelope and providing said measured offset and said size to said controller;

comparing said measured offset to the designed offset for the envelope size to provide an offset difference;

comparing said offset difference to said offset tolerance value to provide a reject signal when said offset difference exceeds said offset tolerance;

utilizing said reject signal to dispense an identification article onto the fixture carrying the rejected envelope and to place a reject mark onto the rejected envelope.

10. The method of claim 9 further including the step of utilizing said reject signal to actuate a fixture stop device to position said fixture at a preselected position in the proximity of an identification article dispensing device.

11. The method of claim 10 further including the step of utilizing a transfer mechanism to transfer envelopes from one conveyance mechanism to another conveyance mechanism.

12. method of claim 11 further including the step of maintaining a record of measured envelopes and the measured offset values of said envelopes.

* * * * *